J. J. NILSON.
ROAD GRADER.
APPLICATION FILED MAY 28, 1914.
1,210,517.
Patented Jan. 2, 1917.
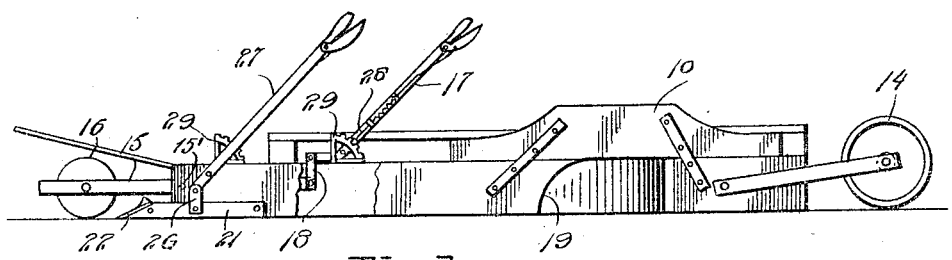
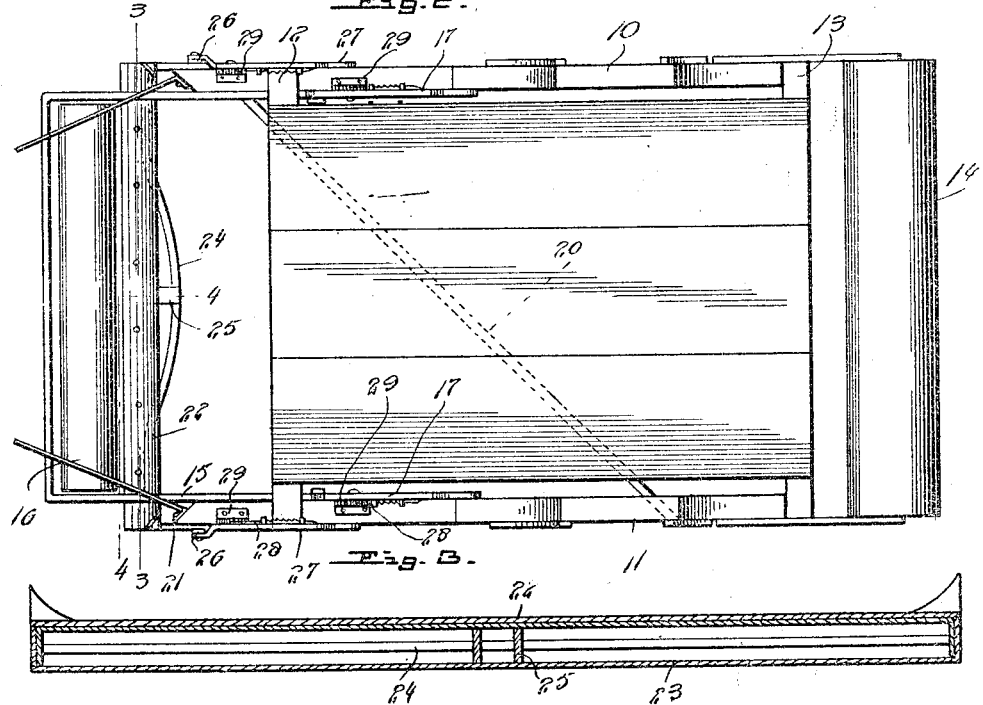
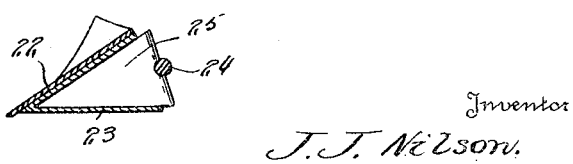
Witnesses
Chas. E. Kemper.
Harry M. Test
Inventor
J. J. Nilson.
By Chandler & Chandler
Attorneys

UNITED STATES PATENT OFFICE.

JENS J. NILSON, OF HOLMQUIST, SOUTH DAKOTA.

ROAD-GRADER.

1,210,517.  Specification of Letters Patent.  Patented Jan. 2, 1917.

Application filed May 28, 1914.  Serial No. 841,539.

*To all whom it may concern:*

Be it known that I, JENS J. NILSON, a citizen of Norway, residing at Holmquist, in the county of Day, State of South Dakota, have invented certain new and useful Improvements in Road-Graders; and I do hereby declare the following to be a full, clear, and exact description of the invention, such as will enable others skilled in the art to which it appertains to make and use the same.

This invention relates to improvements in road scraping and grading machines.

One object of the present invention is to provide a novel cutting device for scraping and leveling the road surface preparatory to rolling.

Another object is to provide a cutter which can be quickly and easily raised and lowered according to the depth of the cut desired.

Other objects and advantages will be apparent from the following description when taken in connection with the accompanying drawing.

In the drawing: Figure 1 is a side elevation of a grading machine made in accordance with my invention. Fig. 2 is a top plan view of the same. Fig. 3 is an enlarged transverse sectional view on the line 3—3 of Fig. 2. Fig. 4 is a vertical section on the line 4—4 of Fig. 1, enlarged.

Referring particularly to the accompanying drawings, there is shown a frame which includes the longitudinally extending parallel members 10 and 11 which are connected at their respective ends by the transverse members 12 and 13. Mounted at the rear of the frame is a smoothing roller 14, and mounted on the forward end of the frame is a pivoted frame 15 in which is journaled a roller 16. The side members of the frame 15 rearwardly of their pivots are connected to the lower ends of the operating levers 17 by means of the vertical links 18. Thus by swinging the operating levers, the frame 15 may be caused to swing upwardly or downwardly to raise and lower the roller 16. In the side member 11, adjacent the rear end thereof is an outlet opening 19, and secured to the side members and extending from a point adjacent the forward end of the member 10, to a point just in rear of the opening 19 is a smoothing or scraping blade 20.

Pivotally mounted across the front of the frame by means of the rearwardly extending arms 21 is a transverse cutter blade 22, a suitable guard 23 being carried below the knife. Extending longitudinally between the guard and knife, and secured at its ends to the forward ends of the arms 21 is a truss rod 24, the center of which is supported by a block 25 disposed between the guard and blade. Pivotally carried by each of the arms 21, forwardly of its pivot is a link 26, the upper end being pivotally connected with an operating lever 27. Each of the levers 27 and 17 carries a pawl 28 for engagement with the teeth of a segmental rack 29 mounted on the frame.

By means of the levers 27, and the link connections with the arms 21 the blade 22 can be raised and lowered to the height desired and according to the depth it shall cut or slice from the surface of the road. By means of the pivoted frame 15, and the lever means for raising and lowering the same, the roller 16 can move in such positions with relation to the cutting blade 22, that the thickness of the slice can also be regulated. The roller thus acts as a gage as well as a guard.

What is claimed is:

A road grading machine comprising a frame, a horizontally disposed and transversely extending cutting blade for cutting a slice from the surface of the road, and a depth gage consisting of a frame pivotally mounted on the first frame and extending forwardly of the said blade, a smooth cylindrical roller mounted on the forward end of the pivoted frame and disposed in front of and above the blade, and means for adjustably moving the pivoted frame on its pivots.

In testimony whereof, I affix my signature, in the presence of two witnesses.

JENS J. NILSON.

Witnesses:
HERMAN HOLMQUIST,
CHRISTIAN A. OLSON.